(12) United States Patent
Johnson et al.

(10) Patent No.: US 10,071,921 B2
(45) Date of Patent: Sep. 11, 2018

(54) ELECTROCHEMICAL REACTOR SYSTEM FOR TREATMENT OF WATER

(71) Applicants: Michael M. Johnson, Redmond, WA (US); Edward J. Minger, Seattle, WA (US); Daniel C Rich, Puyallup, WA (US); Caleb S Payne, Auburn, WA (US)

(72) Inventors: Michael M. Johnson, Redmond, WA (US); Edward J. Minger, Seattle, WA (US); Daniel C Rich, Puyallup, WA (US); Caleb S Payne, Auburn, WA (US)

(73) Assignee: Lean Environment Inc., Kirkland, WA (US)

( * ) Notice: Subject to any disclaimer, the term of this patent is extended or adjusted under 35 U.S.C. 154(b) by 279 days.

(21) Appl. No.: 14/546,899

(22) Filed: Nov. 18, 2014

(65) Prior Publication Data

US 2015/0151985 A1 Jun. 4, 2015

Related U.S. Application Data

(60) Provisional application No. 61/963,411, filed on Dec. 2, 2013.

(51) Int. Cl.
*C02F 1/461* (2006.01)
*C02F 1/463* (2006.01)
(Continued)

(52) U.S. Cl.
CPC .......... *C02F 1/463* (2013.01); *C02F 1/46176* (2013.01); *C02F 2001/46157* (2013.01);
(Continued)

(58) Field of Classification Search
CPC ................. C02F 1/463; C02F 1/46176; C02F 2001/46157; C02F 2001/4617;
(Continued)

(56) References Cited

U.S. PATENT DOCUMENTS 4,451,338 A * 5/1984 Deininger .......... C01G 49/0081
205/548
4,556,469 A * 12/1985 Kim .......................... C25C 1/20
204/263

(Continued)

FOREIGN PATENT DOCUMENTS

CA 2247135 8/2006
CN 101671066 9/2011

(Continued)

OTHER PUBLICATIONS

Chen. Electrochemical technologies in wastewater treatment. Separation and Purification Technology. vol. 38. 2004. pp. 11-41.*

*Primary Examiner* — Ciel P Thomas
(74) *Attorney, Agent, or Firm* — Jensen & Puntigam, P.S.

(57) ABSTRACT

An upright reactor body with a perforated interior tube member which extends for the length of the reactor body. A water inlet permits water to be treated into the perforated tube member. A fibrous metal anode surrounds the perforated tube member followed by a surrounding layer of dielectric and then a surrounding metal cathode layer, wherein water from the inlet passes radially through the perforations in the tube member, through the anode, dielectric and cathode members, emerging from the reactor body through an outlet. A DC voltage is imposed on the cathode and anode.

14 Claims, 3 Drawing Sheets

(51) Int. Cl.
*C02F 101/10* (2006.01)
*C02F 101/16* (2006.01)
*C02F 101/20* (2006.01)
*C02F 101/32* (2006.01)
*C02F 103/00* (2006.01)

(52) U.S. Cl.
CPC ............... *C02F 2001/46171* (2013.01); *C02F 2101/105* (2013.01); *C02F 2101/106* (2013.01); *C02F 2101/163* (2013.01); *C02F 2101/20* (2013.01); *C02F 2101/325* (2013.01); *C02F 2103/001* (2013.01); *C02F 2201/003* (2013.01); *C02F 2201/4617* (2013.01); *C02F 2301/026* (2013.01)

(58) Field of Classification Search
CPC .......... C02F 2101/105; C02F 2101/106; C02F 2101/163; C02F 2101/20; C02F 2101/325; C02F 2103/001; C02F 2201/003; C02F 2201/4617; C02F 2301/026

See application file for complete search history.

(56) References Cited

U.S. PATENT DOCUMENTS

| | | | | |
|---|---|---|---|---|
| 5,690,806 | A | * | 11/1997 | Sunderland ............... C25C 1/00 204/237 |
| 5,868,943 | A | | 2/1999 | Donnelly, Jr. |
| 2007/0017877 | A1 | * | 1/2007 | Musson .................. C02F 1/469 210/748.16 |
| 2007/0210009 | A1 | * | 9/2007 | Haught ............... C02F 1/46114 205/751 |
| 2011/0068006 | A1 | * | 3/2011 | Kitaev .................. C02F 1/4672 204/572 |
| 2011/0180397 | A1 | * | 7/2011 | Hayakawa .............. C02F 1/505 204/248 |
| 2011/0226615 | A1 | | 9/2011 | Bakhir et al. |
| 2012/0247959 | A1 | * | 10/2012 | Seed ..................... C02F 1/4691 204/554 |
| 2013/0146474 | A1 | * | 6/2013 | Sullivan ................... C25B 1/26 205/510 |

FOREIGN PATENT DOCUMENTS

| | | |
|---|---|---|
| GB | 2500663 | 10/2013 |
| JP | 2008043891 | 2/2008 |

\* cited by examiner

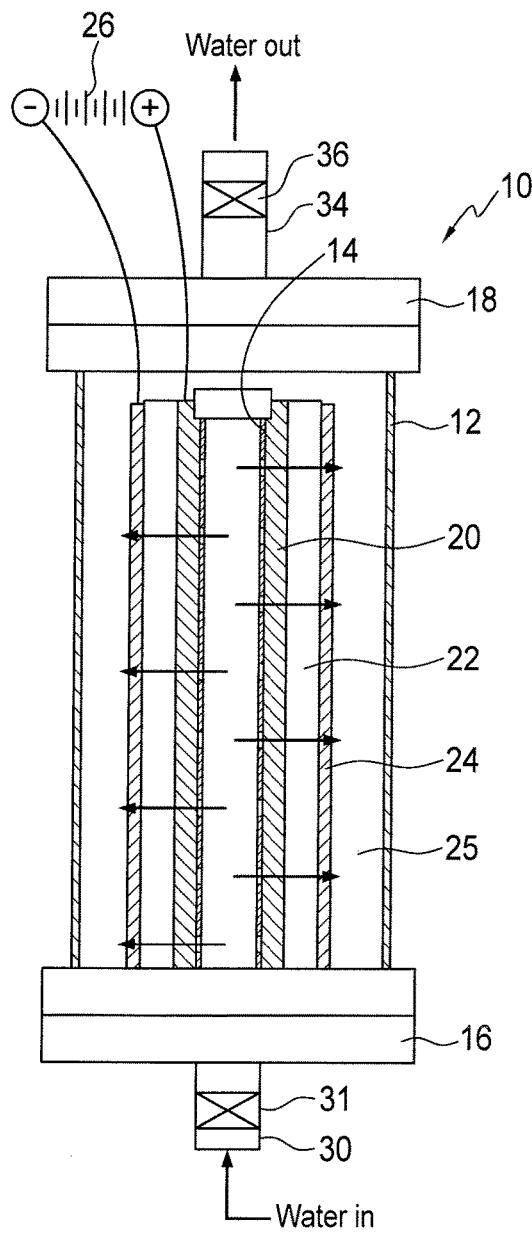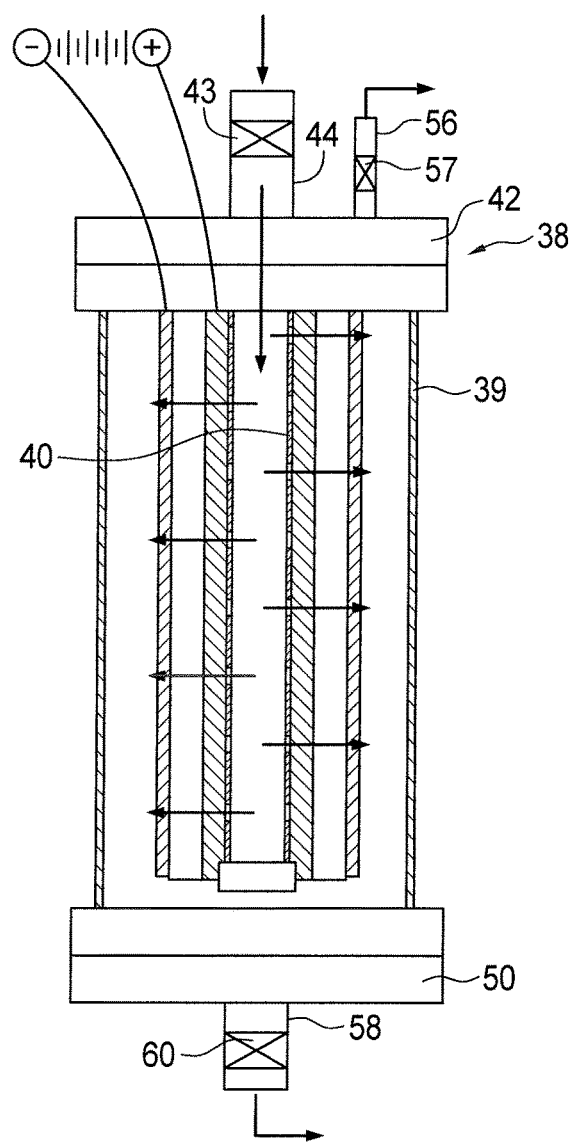
FIG. 1
FIG. 2

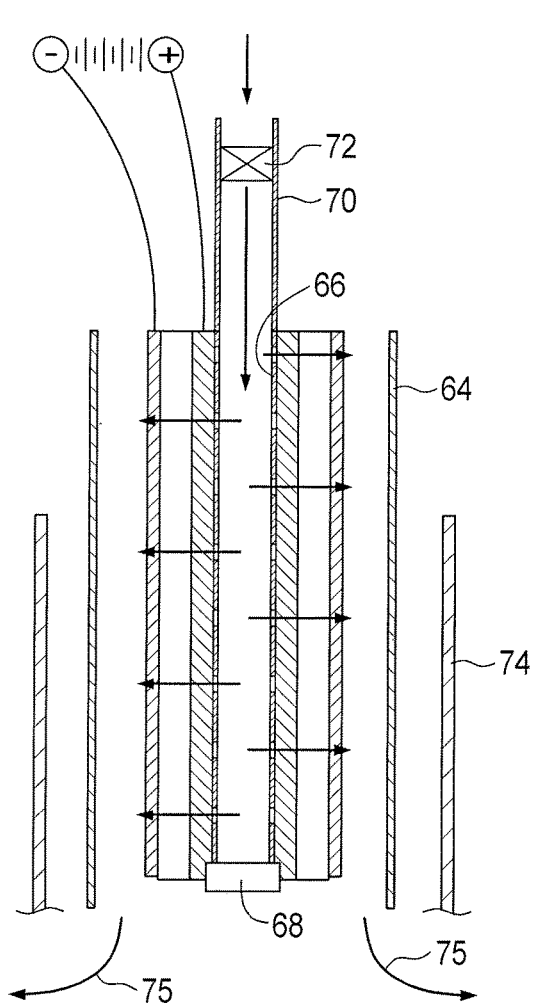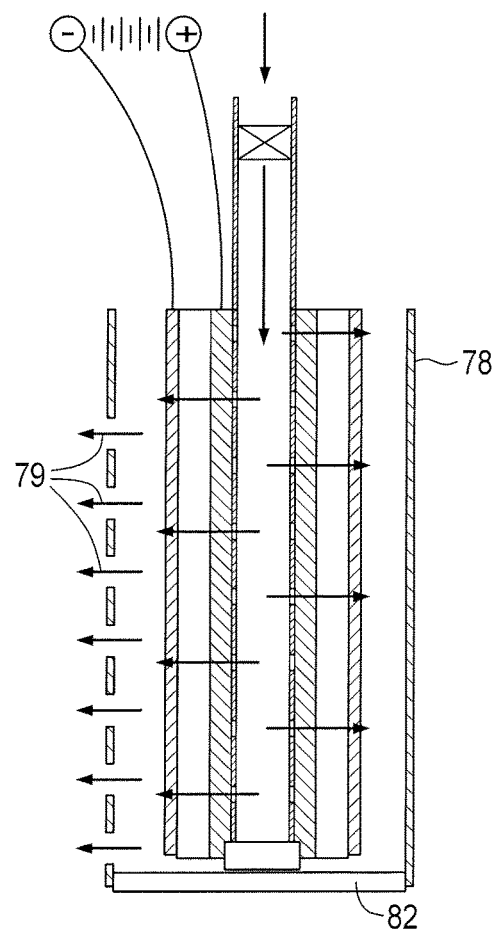
FIG. 3
FIG. 4

SPIRAL CONFIGURATION

CONCENTRIC CONFIGURATION

ELECTROCHEMICAL REACTOR SYSTEM FOR TREATMENT OF WATER

TECHNICAL FIELD

This invention relates generally to a water processing apparatus and more particularly to a water treatment reactor for processing water containing various pollutants, including phosphates, nitrates, dissolved metals, suspended particulates, carbonaceous materials and ionic materials.

BACKGROUND OF THE INVENTION

The need for better and more reliable systems of water treatment has been a historical challenge. In modern industry, the basic need for clean water and the need to comply with regulations have become increasingly challenging when applied to sources which may contain a variety of dilute pollutants that vary significantly over time. Storm water, for instance, has greater challenges because it is often undesirable to use any form of chemical treatment in a waste stream that may be discharged directly to surface water.

In addition to traditional pollutants such as heavy metals, toxic organics and nutrients, suspended solids are difficult to manage by traditional means and traditional water treatment systems. Suspended solids often comprise particles too small for media filters and particles with neutrally repulsive surface charges, such as those found on finely divided silica clays. Electrocoagulation has been used for a long time, but requires high power consumption and high capital expense. Chitosan and other flocculants are effective on some pollutants, but excessive use of such material may be toxic to fish or other aquatic and/or marine species.

DESCRIPTION OF RELATED ART

There are many types of known water treatment reactors and methods. Electrocoagulation is a known method for treating suspended solids, metals and other species. Existing systems rely on plates or other submerged structural arrangements for transmitting electrical current to the solution to be treated. Use of plates of bulk metal components for electrodes requires that the charged ionic species must travel relatively large distances to be in intimate contact with the electrodes or other species with which they must react to produce treatment. The surface area per unit volume for existing configurations is relatively small. The electrodes are submerged in solution. Further, the geometry of plate-type electrodes provides relatively little surface areas per unit volume available for chemical reaction.

SUMMARY OF THE INVENTION

Accordingly, the water treatment system comprises: an upright reactor body; an internal member with openings which extends interiorly of the reactive body, positioned so that there is a space between the internal member and the reactor body; a water inlet for said internal member; a pervious metal anode member surrounding the internal member, such that water must move through the internal member and come into contact with the anode member; a layer of dielectric material surrounding the anode member; a metal cathode element, wherein water passing through the anode and through the dielectric coming into contact with the cathode; an outlet for water passing from the cathode; and a DC supply connecting said anode and said cathode for operation of the water treatment system.

BRIEF DESCRIPTION OF THE DRAWINGS

FIG. 1 is a cross-sectional diagram of a first embodiment of the present invention.

FIG. 2 is a cross-sectional diagram of another embodiment of the present invention.

FIG. 3 is a cross-sectional diagram of a further embodiment of the present invention.

FIG. 4 is a cross-sectional diagram of still another embodiment of the present invention.

BEST MODE FOR CARRYING OUT THE INVENTION

Figure 5A:
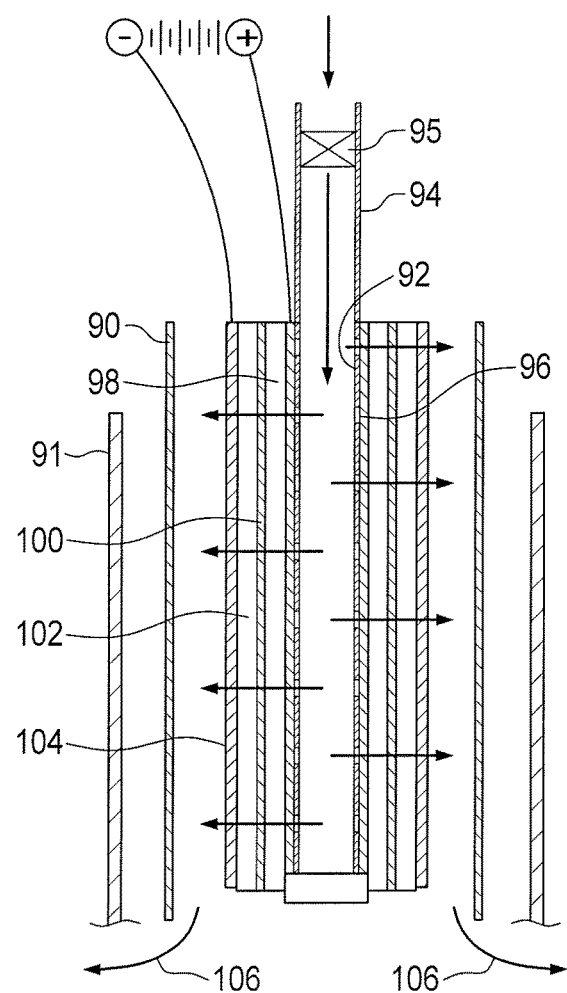
FIG. 5A is a cross-sectional diagram of a still further embodiment of the present invention.
Figure 5B:
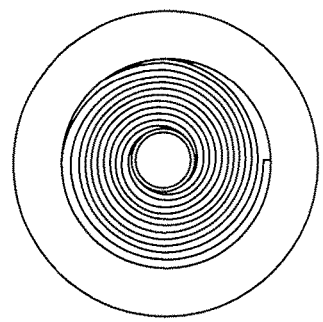
FIG. 5B is a lateral cross-sectional diagram of the embodiment of FIG. 5A, with a spiral configuration of the elements.
Figure 5C:
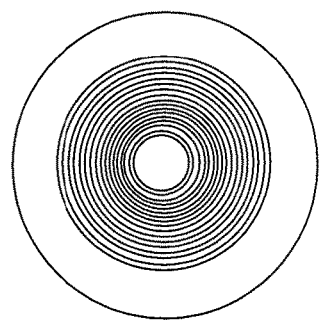
FIG. 5C is a lateral cross-sectional diagram of the embodiment of FIG. 5A with a concentric configuration of the elements.

In general, the present invention includes a water treatment reactor to carry out electrochemical oxidation and reduction and for treatment of pollutants, which include but are not limited to suspended solids, dissolved metals, emulsified oils, dissolved nitrates, chemical oxygen demand (COD) and phosphates. The reactor comprises a central slotted or perforated tube, wrapped with one or more layers of pervious conductive materials, alternating with nonconductive insulating materials which may be used as an electrochemical cell. Water is moved axially through the tube and then passes radially through the perforations in the central tube and the pervious layers. In one or more of the conductive pervious layers surrounding the central tube is a sacrificial anode through which water can flow and which is surrounded by one or more layers of nonconductive material that may be used to electrically isolate the conductive layers through which the water flows. One or more conductive layers may be used as a cathode, electrically isolated from the one or more anode layers. The pervious conductive layers may be comprised of nonwoven fibers, screen material or perforated sheets. Conductive materials may be comprised of metal, graphite or other conductive material. Conductive layers can be comprised of dissimilar metals or graphite in contact with one another in such a way that electrical potential is created in the presence of an electrolyte. Alternating layers of conductive and nonconductive material may be concentric or spiral wound. The central tube may be capped or contain other means to restrict flow on one or both ends. The system may also include an exterior vessel, such as a tank, having a solid or perforated body of plastic or metal. The system may also include an inlet valve for regulating the flow of water, which may be operated in the manner in which the water to be treated is mixed with air or oxygen. The system may also include an orifice or valve for regulating the outgoing flow of treated water, and may include a liquid gas separator outlet or valve near the top of the reactor for regulating the flow of gasses and low density material from the reactor.

The system may also include a direct current (DC) supply capable of producing electrical current with the positive electrode electrically connected to the anode of the reactor and the negative electrode electrically connected to the cathode of the reactor. The invention relates specifically to simultaneous treatment of heavy metals and turbidity, using neither chemicals nor power intensive electrocoagulation systems. In most cases, turbidity is caused by suspended soils or other pollutants. Soils in many areas are primarily clay or other forms of finely divided silicates or aluminates. These particles have mutually repulsive negative charges on their exterior, due largely to terminal oxygen atoms on the edges of the crystal structures. Precipitation of the particles requires disruption of the negative repulsion between the particles, either by addition of a dissolved positive charge or reduction of the terminal oxygen. Finely divided steel wool may in one embodiment be used as one component of an electrode (anode) to provide a high surface of anode area per unit volume, thereby encouraging the passive dissolution of ferrous ion from the anode to facilitate nucleation of coagulated particles. Moving water to be treated through a fibrous structure further minimizes the mean-free-path of the suspended particles to be treated. Chemical dissolution of metal ions is another mechanism for the oxidation reduction reactions, without use of applied voltage. The reactor(s) may be suspended in the air above a tank while water flows through the reactor, thereby ensuring good mixing of the water being treated with air and ensuring high levels of dissolved oxygen in the water to be treated. Chemical dissolution of the ferrous metal is highly dependent on the concentration of dissolved oxygen concentration in the water to be treated. As pH drops below 7, the dissolution reaction accelerates.

A low positive voltage (<20V) is imposed on the steel wool anode to accelerate the rate of dissolution and provides for reduction of hydrogen ions on the cathode, thereby balancing the half-cell anodic reaction. Due to the large surface area of the fibrous anode and the presence of dissolved oxygen, the energy required is far less than traditional plate-type electrocoagulation systems, but accomplishes similar treatment results. For fine steel wool, with a diameter of 0.05 mm, the surface area of one meter length is approximately 157 $mm^2$.

The ability of the present system to complete oxidation reduction reactions is apparent on analysis, since the formation of positive metal ions requires reduction of other species in solution. In environments where either no voltage is applied or the voltage is low enough to not cause disassociation of water molecules, the electrons must reduce other dissolved species in the water being treated.

In one experiment, steel wool was used as the anode and an aluminum bar as the cathode. Full scale units comprised of a 108-inch long plastic pipe as the inner central tube to receive the water, which was wrapped in course steel wool, which in turn was wrapped in aluminum screen. These elements were separated by a plastic screen material. In this experiment, water was pumped downward through the central tube, which was capped on the bottom and positioned above a 10-foot deep tank. Water was passed radially through the slots or openings in the central tube, and then through five layers, including steel wool, surrounded by aluminum screen, then plastic screen material, then several layers of aluminum screen for a cathode, and finally by stainless steel bands, all placed inside of a 6-inch perforated plastic pipe. A 300 mV potential was observed to be present between the anode and the cathode when the power was turned off. The measured voltage is due to the difference in potential between the steel wool and the aluminum in the presence of an electrolyte. Selection of particular anode and cathode materials enhances this effect, creating a galvanic cell in the presence of electrolytes. This action depends on the conductivity of the water to be treated. If incoming water is free from ions, then no reaction will take place.

The general objective of the present invention is to provide a reactor design which will simultaneously carry out treatment of water containing dissolved metals, phosphates, nitrates, BOD/COD, selenium and suspended particles and other pollutants by means of electrochemical treatment and electrocoagulation. FIGS. 1-5 show five related embodiments of the present invention. These embodiments are described more particularly below.

In general, dissimilar metals in contact with one another in the presence of a conductive electrolyte, such as waste water or storm water, provide a voltage, due to difference in electrode potential in dissimilar metals, and form the structure of a galvanic cell, as mentioned above. The dissimilar metals are arranged in a pervious or fibrous structure in a radial configuration (wrapped around a central axial slotted pipe or tube) and placed in the path of dissolved ionic species. Desirable oxidation/reduction reactions can thus occur, resulting in the dissolution of metal reagents and reduction of dissolved pollutants. The presence of oxygen increases the rate of anodic dissolution. The invention can be used for pretreating water supplies, in storm water treatment systems, in industrial wastewater treatment systems, in agricultural waste treatment systems, remediation systems and water treatment systems in other related industries. One advantage of the present approach is that the water to be treated must flow through the pervious electrodes, thereby minimizing the distances between surfaces and the mean free path of the charged species, and greatly increasing the ferrous metal surface area of the electrodes for reaction with dissolved oxygen and increasing the rate of ferrous anode dissolution. As a result, effective treatment can be made at relatively low voltage for both kinetic and thermodynamic reasons. The water to be treated is alternately exposed to a sacrificial anode on the reactor interior, which causes an oxidation/reduction reaction and cations to be introduced into the solution. At the anode, dissolved species are reduced (e.g. nitrates, phosphates, metals) as metals from the anode are dissolved through electrochemical oxidation. Oxidized metal ions from the anode become electrochemical reagents facilitating the coagulation of negatively charged particles, suspended particles outside of the reactor.

In operation of the below-described embodiments, incoming water flows from a pressurized entry end into the central pipe, axially along the central pipe, then radially through perforations or slots in the pipe. This water flows radially through and impinges upon the fibrous conductive material having a predetermined range of electrical potential, where an exchange of electrons occurs, resulting in an oxidation-reduction reaction. The water then flows through adjacent dielectric material that serves to electrically isolate the anode layer from the cathode layer. The dielectric material is surrounded by a pervious conductive layer, comprised of a screen material, expanded metal or fibrous metal that acts as the cathode and which is electrically isolated from the anode layer. These elements may be structurally mounted within the rigid reactor body such that water to be treated must pass through the layers radially prior to discharge from the reactor vessel. The direction of current from the power supply can vary depending on the type of reaction desired. The effect of this arrangement is a relatively high surface area to volume ratio. As indicated above, the surface area of a one meter length of fine steel wool is approximately 157 $mm^2$. The mass of the same length of steel wool is 0.149 grams. The mass of one liter of compacted fine steel wool is approximately 500 grams, with a void space of approximately 93%. Accordingly, one liter of compacted steel wool contains up to 527,000 mm² of surface area so the ratio of surface area per unit volume is ten to one hundred times higher than the ratio for plate electrodes. As a result of passive dissolution of ferrous metals and galvanic effect, the efficiency of the reactor is significantly higher than plate-type arrangements, and allows for a greater degree of treatment with a smaller reactor and lower amperage.

Electrodes may dissolve naturally without the use of current, or through the electrochemical dissolution brought about by dissimilar metals. Metals higher in the galvanic series will dissolve preferentially. Aluminum in contact with iron in the presence of an electrolyte will corrode quickly. This process is accelerated with the presence of imposed positive charge or imposed voltage. As a result, a higher surface area per unit volume provided by the fibrous electrodes provides much faster treatment than might be expected from a reactor of comparable size or electrical consumption. An effect of the additional surface area is that a chemical dissolution occurs in conjunction with the electrochemical reaction, such that the reaction rate is higher than that expected from a purely electrochemical effect. Consequently, the reactor is not dependent solely on the amount of electrical current applied to the system. For example, iron will dissolve in the presence of oxygen without an applied current by corrosion until equilibrium is reached.

FIG. 1 is a cross-sectional diagram of an electrochemical reactor 10 in an upflow configuration. It includes a reactor body 12 which for instance is made of PVC or other plastic pipe. In one embodiment, the reactor body 10 has a diameter of approximately 8 inches, although this dimension can vary. An interior pipe 14 is also made of PVC, which is slotted or perforated to permit axial water flow therethrough. In the embodiment shown, the diameter of pipe 14 is approximately 2 inches, and includes a plurality of slots or perforations which extend circumferentially around the pipe at specific locations. In one example, the perforations are separated vertically by approximately 4 inches and circumferentially by approximately 2 inches, although this can vary. The slots/perforations can also be random. Embodiment 1 is an upflow configuration, such that the lower end of the reactor body 12 is connected to a lower end cap or flange 16, while the upper end of the reactor body includes an upper end cap flange 18. Surrounding the pipe 14 is a fibrous metal anode 20, which in the embodiment shown can be steel wool, aluminum wool or other metal wool. In the embodiment shown, the anode is approximately 2 inches thick, although again this dimension can vary. Surrounding the fibrous metal anode 20 is a layer of dielectric material 22. In the embodiment shown, this layer is approximately ½-inch thick. The dielectric material comprises plastic webbing or nonwoven polymeric fiber such as polyethylene glass fiber, polypropylene, or similar material. Surrounding the dielectric material is a metal cathode 24 which in the embodiment shown is approximately one inch thick and comprises steel wool, metal screen, metal wool or expanded metal which is adapted to support the inner layer of the arrangement and to provide large surface areas for ionic conduction and gas formation. In the embodiment shown, there is a space 25 between the cathode 24 and the reactor body 12 of approximately one inch. A DC power supply 26 connects the anode and the cathode of the system as explained above. A water inlet 30 with an inlet valve 31 is connected to the lower end cap or flange allowing water to be moved into the reactor. A water outlet 34 with an outlet valve 36 controls the outflow of the treated water.

FIG. 2 is similar to the embodiment of FIG. 1, except that it has a downflow arrangement instead of an upflow arrangement. It includes a reactor assembly, as shown generally at 38, within a reactor body 39, and includes a generally central perforated tube 40, with an end cap or flange 42 at the top end thereof. The embodiment includes a water inlet 44 with a control valve 43. The embodiment further includes a lower end cap or flange 50 for the reactor body 39. The arrangement includes a gas vent 56 with a control valve 37 at the upper end of the reactor body. The water/solids outlet 58 also includes a control valve 60. The operation of the assembly is basically the same as for FIG. 1, with inlet water moving radially through the system past the cathode and then down out through the outlet 60.

The embodiment of FIG. 3 is also similar to FIG. 1, with a reactor body 64 and a central perforated tube 66. The perforated tube has an end cap 68 at the lower end thereof. The water inlet 70 is at the upper end of the perforated tube with a control valve 72. The reactor body can be immersed, partially immersed or suspended above the liquid level of a vertical tank, shown generally at 74. The clean water comes out of the lower end of the reactor body, shown by the arrows 75, into the tank 74. Multiple reactor assemblies can be positioned in a single vertical tank. The tank 74 is usually large relative to the reactors. One example of a small tank is 408 gallons.

FIG. 4 is similar to FIG. 3, with the reactor body 78 having openings 79 therein, such that water flows out through the reactor body 78 instead of out the lower end thereof. In the embodiment of FIG. 4, the lower end of the reactor body has a plug 82. Again, multiple reactor assemblies can be positioned in a single vertical tank.

FIG. 5A shows a somewhat different embodiment, with a reactor body 90 positioned in a vertical tank 91. The water comes into central tube 92 through inlet 94 with its associated control valve 95. In this embodiment, the assembly includes a fibrous metal anode 96, an adjacent dielectric layer 98, an additional anode layer 100 followed by a dielectric layer 102 and an outer cathode layer 104. The treated water then moves out through the bottom of the open reactor body, as shown by the arrows 106, into the vertical tank. In this arrangement, the anodes and the dielectric can be fashioned in a spiral configuration, as shown by the cross-sectional diagram of FIG. 5B, or a conventional concentric arrangement shown in FIG. 5C.

As indicated above, the present system uses a plurality of exothermic reactions to augment electrochemical process, for enhancing the electrochemical reaction. The high anode surface area per unit volume (discussed above) produced by the steel wool or other fibrous material enhances the dissolution of iron, creating colloidal nucleation sites and co-precipitation. The effect occurs by using any pervious electrode material with a high surface-to-volume ratio. A galvanic effect is produced by using two metals in contact with each other as the anode, accelerating or enhancing the dissolution and creating ionic metals for the colloidal nucleation sites. Dissimilar metals are used for specific pollutants, the selection of which will vary depending on the pollutants. The reactor typically runs in air to facilitate the exothermic formation of hydroxide ion, with high oxygen content to accelerate iron dissolution. An exothermic reaction on the cathode occurs as follows: $2H_2O+O_2+2e^- \rightarrow 4\ OH^-$. This releases approximately $-350$ kj/mol, while traditional submerged electrochemical reactions is endothermic on the cathode, requiring 55 kj/mol of energy. The detailed thermodynamic reaction is as follows: $H_2O \rightarrow OH^- + \frac{1}{2}H_2 = 55.9$ kj/mol energy required for submerged reactions. In the present arrangement; the sum of the standard enthalpies of formation for the products and reactants are summarized as follows:

$$\tfrac{1}{2}O_2 + H_2O = -285.8 \text{ kj/mol and}$$

$$2OH = 2 \times 229.9 = -459.8 \text{ kj/mol.}$$

Therefore:

$$H_2O + \tfrac{1}{2}O_2 \rightarrow 2OH\text{---}=(-459.9+285.8)=-174 \text{ kj/mol}$$

which is the energy released in applicant's system. Hence, the present arrangement using $O_2$ as a reagent on the cathode has a 229 kj/mol advantage over traditional submerged electrochemical systems. This phenomenon is analogous to the preferential corrosion of steel structures at the surface of bodies of water where there is a higher dissolved oxygen content.

The radial arrangement and pass-through design results in the water being in intimate contact with the electrodes. There is no opportunity for channeling with the present system, with the mean free path for unit volume of water up to the nearest electrode is typically on the order of a few millimeters or less.

Accordingly, an electrochemical reduction system has been described which is efficient and effective in treating water with respect to various suspended solids and dissolved minerals, phosphates and nitrates.

Although a preferred embodiment has been disclosed for purposes of illustration, it should be understood that various changes, modifications and substitutions may be incorporated in the preferred embodiment without departing from the spirit of the invention as defined by the claims which follow:

What is claimed is:

1. A water treatment system, comprising:
an upright reactor body;
an internal member with radial openings which extend interiorly of the reactor body, positioned so that there is a space between the internal member and the reactor body;
a water inlet for said internal member;
a first pervious metal electrode member surrounding the internal member, such that water to be treated must move through the internal member and come into contact with the first electrode member;
a layer of dielectric material surrounding the first electrode member;
a second pervious metal electrode member, wherein water to be treated passes through the first electrode member and through the dielectric layer and through the second electrode member;
an outlet for water passing from the second electrode member, wherein at least one of the electrode members is a three dimensional fibrous member with a thickness dimension;
a DC supply connecting said first electrode member and said second electrode member for operation of the water treatment system; and
wherein the reactor body is openly suspended in air above a liquid level in a surrounding tank, using oxygen from the air as a reagent on a selected one of the first electrode member and/or the second electrode member.

2. The system of claim 1, wherein the internal member is a plastic pipe and the openings are perforations or slots.

3. The system of claim 2, wherein the openings extend over the length of the pipe and around the circumference of the pipe.

4. The system of claim 1, wherein the water inlet is at the top of the reactor body, so that water moves axially downward through the internal member and radially through the openings, wherein treated water moves outwardly from the reactor body at a lower end thereof.

5. The system of claim 1, wherein the inlet for the internal member is at the bottom of the reactor body and the outlet is at the top, and wherein there is further a gas outlet at the top of the reactor body.

6. The system of claim 1, wherein the fibrous member is bimetallic, comprising dissimilar metals, the dissimilar metals selected for specific pollutants in the water being treated.

7. The system of claim 1, wherein the fibrous member is made of one steel wool.

8. The system of claim 1, wherein the reactor body is plastic pipe.

9. The system of claim 1, wherein the reactor body is made of metal.

10. The system of claim 1, wherein the first electrode member and the second electrode member are selected such that the system acts as a galvanic cell when the DC supply is off.

11. The system of claim 1, including a plurality of additional alternating first and second electrode members.

12. The system of claim 1, wherein one of the electrode members is an anode and the other electrode member is a cathode.

13. The system of claim 12, wherein the reaction on the cathode is exothermic, producing a release of energy.

14. The system of claim 12, wherein the anode is the first electrode member and the cathode is the second electrode member.

* * * * *